(12) United States Patent
Slusher

(10) Patent No.: US 6,718,116 B1
(45) Date of Patent: Apr. 6, 2004

(54) SAFETY PANEL FOR BIKE

(75) Inventor: Mike Slusher, 2911 Brookshire Dr., Grapevine, TX (US) 76051

(73) Assignee: Mike Slusher, Grapevine, TX (US)

( * ) Notice: Subject to any disclaimer, the term of this patent is extended or adjusted under 35 U.S.C. 154(b) by 0 days.

(21) Appl. No.: 10/365,133

(22) Filed: Feb. 12, 2003

Related U.S. Application Data

(60) Provisional application No. 60/357,378, filed on Feb. 15, 2002.

(51) Int. Cl.$^7$ .............................. G02B 6/00; G02B 5/12; F21V 33/00
(52) U.S. Cl. ........................ 385/147; 362/473; 359/523
(58) Field of Search ................................. 385/147, 901, 385/902; 362/473; 359/523

(56) References Cited

U.S. PATENT DOCUMENTS 4,676,595 A * 6/1987 Danker ........................ 359/523

2003/0067782 A1 * 4/2003 Niezrecki et al. ........... 362/473

* cited by examiner

*Primary Examiner*—John D. Lee
(74) *Attorney, Agent, or Firm*—Wendy Buskop; Buskop Law Group, P.C.

(57) ABSTRACT

The invention is a safety panel for a bicycle and a bicycle and safety panel combination made of rigid display area with a thickness of $\frac{1}{32}^{th}$, a first side, a second side, a first attachment end for folding over the first spoke, a second attachment end for folding over the second spoke, a first adhesive strip and a second adhesive strip disposed on the first side and on the first attachment end, wherein the first adhesive strip is proximate to the second adhesive strip and the first adhesive strip secures to the second adhesive strip, and a third adhesive strip and a fourth adhesive strip disposed the first side and on the second attachment end, wherein the third adhesive strip is proximate to the fourth adhesive strip and the third adhesive strip secures to the fourth adhesive strip.

27 Claims, 5 Drawing Sheets

SAFETY PANEL FOR BIKE

The present application claims priority to Pending patent application Ser. No. 60/357,378 filed in the U.S. Patent and Trademark Office on Feb. 15, 2002.

FIELD OF THE INVENTION

This invention generally relates to a safety panel that can be easily installed around the spokes of a bicycle wheel or any wheel having spokes.

More specifically, the present invention relates to a safety device that can contain fluorescent paint between spokes and can work on any size bicycle, tricycle, or other vehicle having wheels with spokes.

BACKGROUND OF THE INVENTION

A need has long existed for a safety panel which does not impede operation of the wheel, and can be easily installed on a variety of sizes of vehicles having wheels with spokes. The present invention meets this need.

Bicycling is becoming an increasingly more popular form of recreation as well as a means of transportation. Children are using bicycles at night, entering traffic to get around, and they need to be seen as they ride the bikes.

There are many different types of bicycle wheels with different sizes and spoke orientations, different numbers of spokes, shapes of the spokes and other things. Racers use fewer spokes in order to decrease wind resistance. Small children typically have bicycles with more spokes. A safety device, which can contain pigment, which can easily be installed on children's bikes has long been needed.

A relatively conventional wheel has thirty-six spokes, with adjacent spokes intersecting each other at approximately 27 degrees. Such spokes are typically approximately two millimeters in diameter. More recently, bicycle wheels have been designed with fewer spokes to improve the performance of the bicycle wheel. For example, bicycle wheels have been developed with sixteen spokes. A bicycle wheel with sixteen spokes typically has its spokes intersecting at approximately 54 degrees. The present invention has been designed to meet the needs of the various spoke sizes.

In view of the above, there exists a need for a safety panel which overcomes the above mentioned problems in the prior art. This invention addresses this need in the prior art as well as other needs, which will become apparent to those skilled in the art from this disclosure.

SUMMARY OF THE INVENTION

This invention relates to a safety panel for a bicycle having two wheels, wherein the display area has fluorescent or phosphorescent or "day glo" pigment. The rigid display area has a thickness of $\frac{1}{32}^{th}$ inch and four adhesive.

The invention is also a safety panel for a bicycle, wherein the display area has pigment embedded in the display material. The display wraps around the spoke of the wheel, in the direction of wheel rotation.

The invention particularly relates to the use of the device on a bicycle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

A specific embodiment of the invention will be described by way of example with reference to the accompanying drawings, in which.

The present invention is detailed below with reference to the listed Figures.

DETAILED DESCRIPTION OF THE PREFERRED EMBODIMENTS

Before explaining the present invention in detail, it is to be understood that the invention is not limited to the particular embodiments and that it can be practiced or carried out in various ways.

Figure 1:
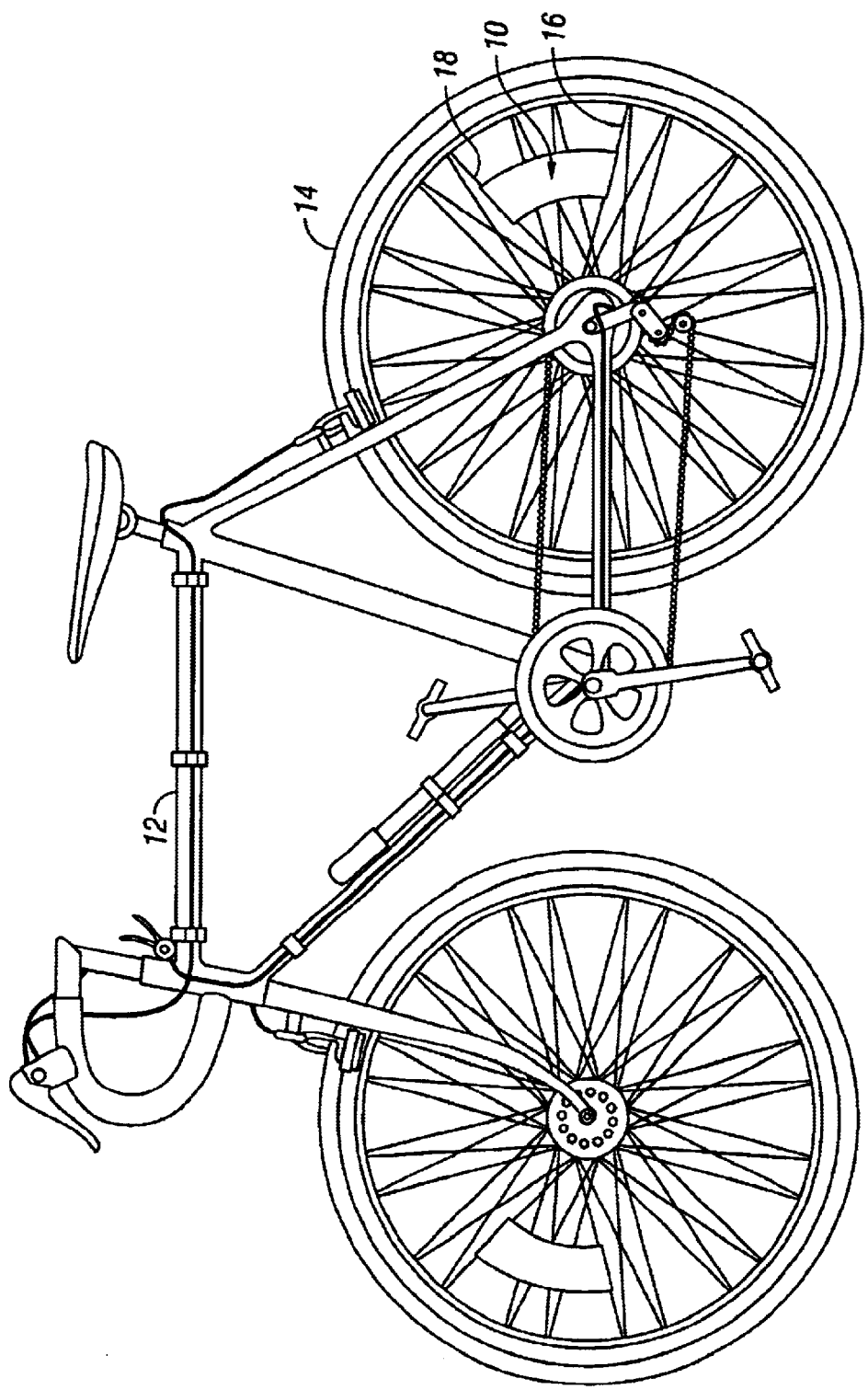
FIG. 1 is a bicycle with the invention attached.

Referring to FIG. 1, the present invention is a safety device 10 for a bicycle 12 having a first wheel 14 and a second wheel 15. The first wheel 14 has a first spoke 16 and a second spoke 18.

Figure 2:
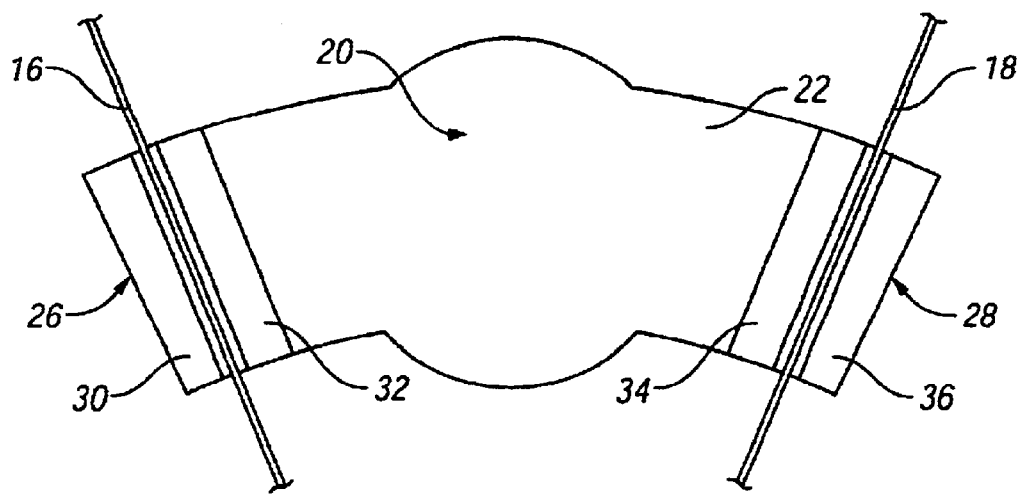
FIG. 2 is a top view of the invention.
Figure 3:
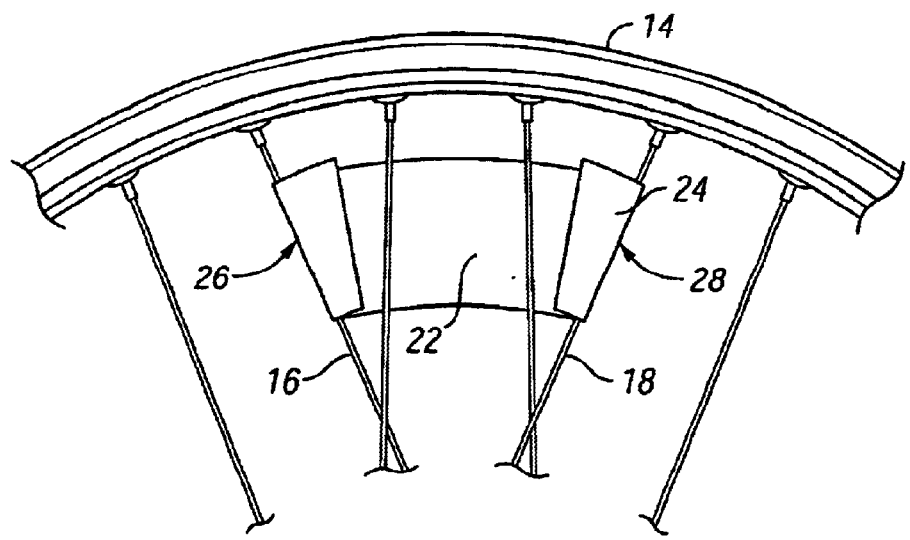
FIG. 3 shows a perspective view of the folded invention.

FIG. 2 shows the invention has a rigid display area 20 with a first side 22, and a second side 24, as shown in FIG. 3. Returning to FIG. 2, a first attachment end 26 for folding over the first spoke 16 and a second attachment end 28 for folding over the second spoke 18. The rigid display area 20 preferably has a thickness of $\frac{1}{32}^{th}$ inch.

FIG. 2 also shows a first adhesive strip 30 and a second adhesive strip 32 disposed on the first side 22 and on the first attachment end 26. A third adhesive strip 34 and a fourth adhesive strip 36 are disposed on the first side 22 and on the second attachment end 28. The first adhesive strip 30 is proximate to the second adhesive strip 32, and the third adhesive strip 34 is proximate to the fourth adhesive strip 36. In this embodiment, the first adhesive strip 30 secures to the second adhesive strip 32 around spoke 16, and the third adhesive strip 34 secures to the fourth adhesive strip 36 around spoke 18.

The vehicle on which the invention can be used can be a bicycle, tricycle, unicycle, baby carriage, trailer, motorcycle, scooter, shopping cart, or wagon.

The safety device most preferably has a length between 4 inches and 13 inches, and a width of between 3.5 inches and 5 inches.

For wheels that range in diameter from 26 to 27 inches, the safety device has a 12.57 inch length and a width of 3.5 inches.

For wheels that have a diameter from 24 inches, the safety device has an 11 inch length and a width of 3 inches.

For wheels that range in diameter from 16 to 20 inches, the safety device has an 8 inch length and a width of 2.5 inches.

In a preferred embodiment shown in FIG. 2, the rigid display area 20 is circular. However, the rigid display area 20 can be crescent shaped and between 30 and 90 degree of arc.

In another preferred embodiment, the rigid display area has 60 degree arc.

The rigid display area 20 can be sheet plastic and utilize an adhesive that has a holding power of at least 1 lb per square inch, and withstand shear of up to 60 pounds per square inch.

Preferably the rigid display area 20 is made from polypropylene, Mylar, or an acrylic.

The adhesive of adhesive 30, 32, 34, and 36 can be a two sided adhesive tape capable of supporting at least 1 pound per square inch.

The safety device can have pigment disposed on the surface of the first side 22, or only on top of the rigid display area 20.

Preferably, the pigment can be in the form of lettering or logos. The pigment can be a phosphorescent, fluorescent, luminescent, or opaque pigment. The pigment can be embedded in the sheet plastic. Additional pigment can be disposed on the sheet plastic or rigid display area 20.

In another embodiment the adhesive strips can be square patches.

FIG. 3 shows the invention preferably with a first side 22, and a second side 24, a first attachment end 26 for folding over the first spoke 16 and a second attachment end 28 for folding over the second spoke 18 of wheel 14.

Figure 4:
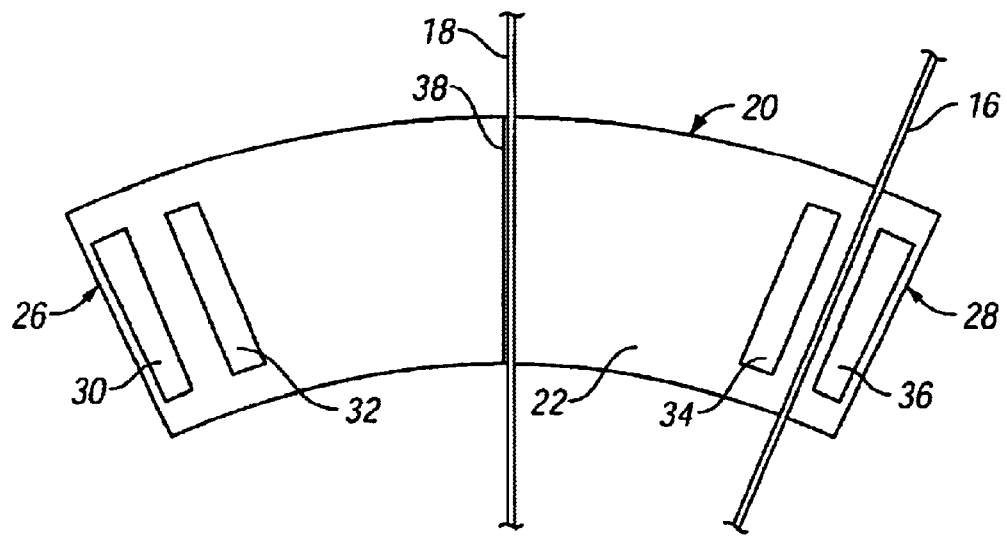
FIG. 4 shows another view of the invention.

FIG. 4 provides a detail of the invention that shows a first adhesive strip 30 and a second adhesive strip 32 that is disposed on the first side 22 and on the first attachment end 26. A third adhesive strip 34 and a fourth adhesive strip 36 are disposed on the first side 22 is proximate to each other on the second attachment end 28.

The first attachment end 26 of the rigid display area 20 folds around the second spoke 18 over the first spoke 16 and secures the first and second adhesive strips 30 and 32 to the third and fourth adhesive strips 34 and 36, such that the second spoke 18 nestles with the fold 38.

Figure 5:
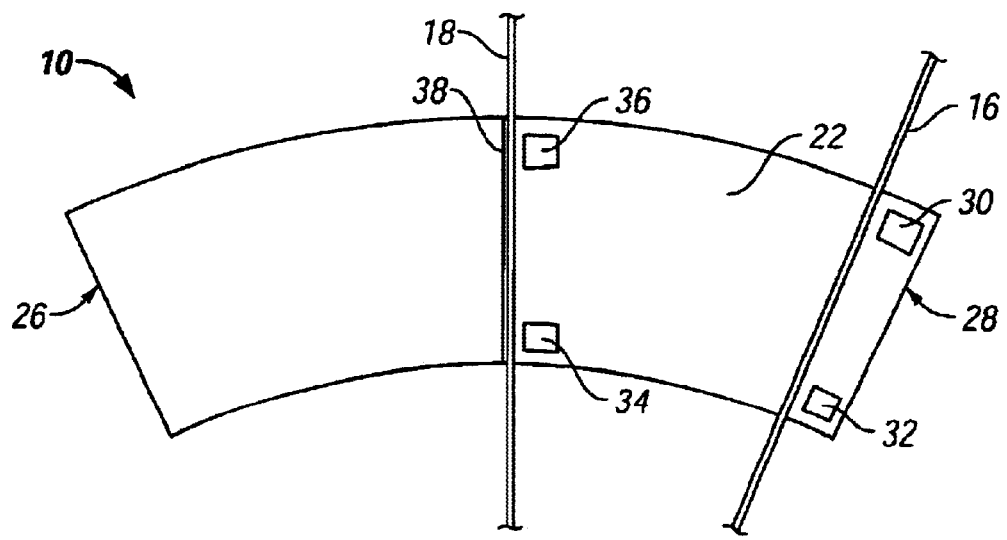
FIG. 5 shows another view of the invention.

Referring to FIG. 5, which provides another embodiment of the safety device 10. The rigid display area wraps around the second spoke 18 in the direction of wheel rotation. The first attachment end 26 wraps over spoke 18 forming fold 38 and securing to the first adhesive 30, the fourth adhesive strip 36, second adhesive strip 32, and the third adhesive strip 34. The first spoke 16 disposed between the first adhesive strip 30 and the fourth adhesive strip 36 and between the second adhesive strip 32 and the third adhesive strip 34. The adhesive strips in this embodiment are square.

Figure 6:
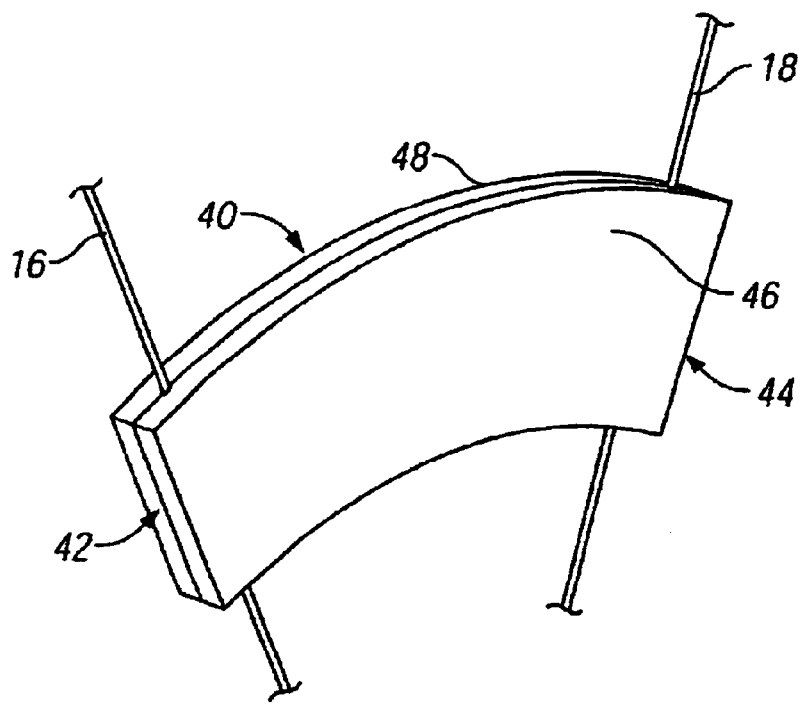
FIG. 6 shows a perspective view of the invention attached to two spokes.

As shown in FIG. 6, a rigid display support 40 preferably has a first support end 42, a second support end 44, a first support side 46, and a second support side 48. Spokes 16 and 18 are contained within the rigid display support 40.

Figure 7:
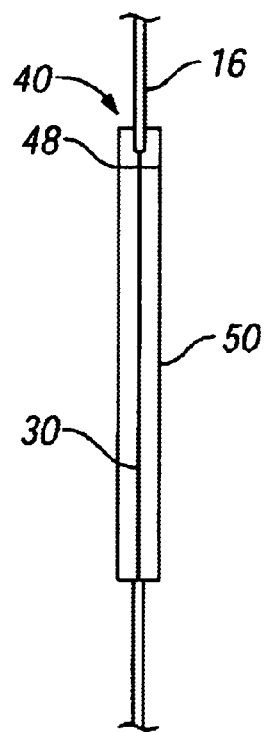
FIG. 7 shows the end view of the invention.

FIG. 7 shows the embodiment of FIG. 6, wherein the rigid display support 40 has a rigid display top 50, which attaches to the rigid display support 40, forming a laminate. Preferably, the first spoke 16 is disposed between the first adhesive strip 30 and the second adhesive strip 32 (not shown in this Figure), and between the rigid display top 50, and a second support 48. The rigid display support 40, and the second spoke 18 is disposed between the third and fourth adhesive strips, between the rigid display top 50 and the rigid display support 40.

Figure 8:
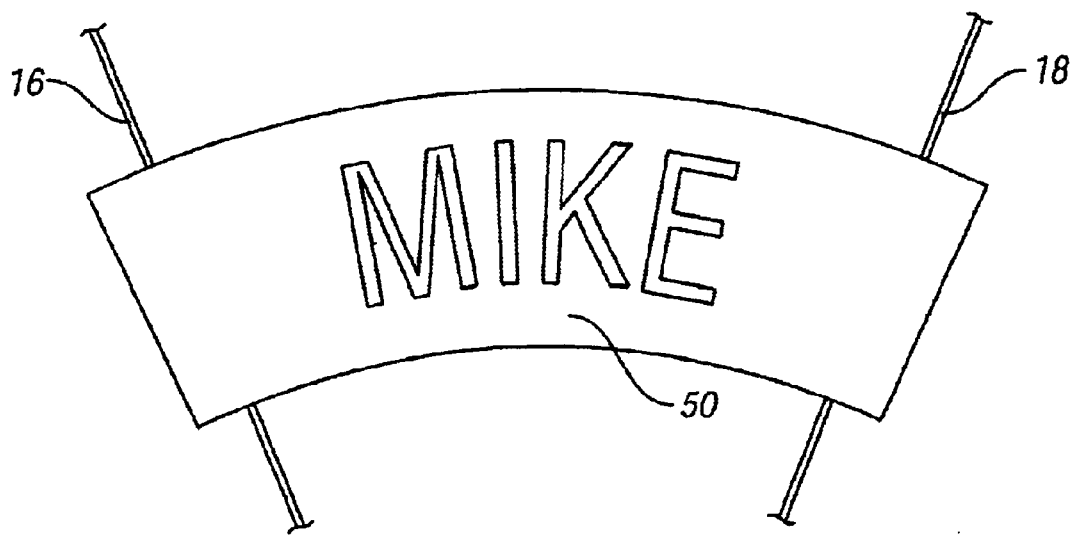
FIG. 8 shows the front view of the invention.

FIG. 8 shows the rigid display top 50 being painted with the name "Mike" and supported between spokes 16 and 18.

The foregoing disclosure and description of the invention are illustrative and explanatory thereof and various changes in the method and system and in the size, shape and materials, as well as in the details of the illustrated construction, may be made within the scope of the claims without departing from the spirit of the invention.

What is claimed is:

1. A safety panel for a bicycle comprising a first wheel and a second wheel, and wherein the first wheel has a first spoke and a second spoke, comprising:
   a. a rigid display area comprising
      i. a first side;
      ii. a second side;
      iii. a first attachment end for folding over the first spoke;
      iv. a second attachment end for folding over the second spoke;
      v. wherein the rigid display area has a thickness of $\frac{1}{32}^{th}$ inch; and
      vi. wherein the rigid display area has a pigment disposed on the rigid display area selected from the group consisting of fluorescent, phosphorescent, and luminescent;
   b. a first adhesive strip and a second adhesive strip disposed on the first side and on the first attachment end, wherein the first adhesive strip is proximate to the second adhesive strip and the first adhesive strip secures to said second adhesive strip; and
   c. a third adhesive strip and a fourth adhesive strip disposed on the first side and on the second attachment end, wherein the third adhesive strip is proximate to the fourth adhesive strip and said third adhesive strip secures to said fourth adhesive strip.

2. The safety panel of claim 1, wherein said safety panel has a length between 4 inches and 13 inches and a width of between 3.5 inches and 5 inches.

3. The safety panel of claim 2, wherein the first wheel, the second wheel or combinations thereof has a diameter between 26 inches and 27 inches and said safety panel has a length of 12.57 inches and a width of 3.5 inches.

4. The safety panel of claim 2, wherein the first wheel, the second wheel or a combination thereof has a diameter of 24 inches and said safety panel has a length of 11 inches and a width of 3 inches.

5. The safety panel of claim 2, wherein the first wheel, the second wheel or a combination thereof has a diameter between 16 inches and 20 inches and said safety panel has a length of 8 inches and a width of 2.5 inches.

6. The safety panel of claim 1, wherein the rigid display area is circular.

7. The safety panel of claim 1, wherein the rigid display area is crescent shaped and has an arc between 30 degrees and 90 degrees.

8. The safety panel of claim 1, wherein the rigid display area has a 60 degree arc.

9. The safety panel of claim 1, wherein said rigid display area is a sheet plastic with a holding power of 1 lb per square inch and a withstand shear of 60 pounds per square inch.

10. The safety panel of claim 9, further comprising a sheet plastic pigment embedded in the sheet plastic.

11. The safety panel of claim 9, further comprising a sheet plastic pigment disposed on said sheet plastic.

12. The safety panel of claim 1, wherein the rigid display area is a material selected from the group consisting of polypropylene, Mylar, and acrylic.

13. The safety panel of claim 1, wherein the first adhesive, the second adhesive, the third adhesive, the fourth adhesive or a combination thereof is a two-sided adhesive tape capable of supporting at least 1 pound per square inch.

14. The safety panel of claim 1, wherein the first adhesive strip, the second adhesive strip, the third adhesive strip, the fourth adhesive strip or combinations thereof are square patches.

15. A safety panel for a bicycle having a first wheel and a second wheel, wherein said first wheel has a first spoke and a second spoke, comprising:
   a. a rigid display area comprising
      i. a first side;

ii. a second side;
iii. a first attachment end for folding over the first spoke;
iv. a second attachment end for folding over the second spoke;
v. wherein the rigid display area has a thickness of $1/32^{nd}$ inch; and
vi. wherein the rigid display area has a pigment disposed on the rigid display area selected from the group consisting of fluorescent, phosphorescent, and luminescent;

b. a first adhesive strip and a second adhesive strip disposed on the first side and on the first attachment end, wherein the first adhesive strip is proximate to the second adhesive strip;

c. a third adhesive strip and a fourth adhesive strip disposed on the first side and on the second attachment end, wherein the third adhesive strip is proximate to the fourth adhesive strip; and d. a fold formed in said rigid display area, wherein said rigid display area wraps around the second spoke, in a direction of wheel rotation, and said first adhesive strip adheres to said fourth adhesive strip, and said second adhesive strip adheres to said third adhesive strip and said second spoke nestles within said fold and said first spoke is disposed between the adhered first and fourth adhesive strips and the adhered second and third adhesive strips.

16. The safety panel of claim 15, wherein the first adhesive strip, the second adhesive strip, the third adhesive strip, the fourth adhesive strip or combinations thereof are square patches.

17. The safety panel of claim 15, wherein said safety panel has a length between 4 inches and 13 inches and a width between 3.5 inches and 5 inches.

18. The safety panel of claim 15, the first wheel, the second wheel or combinations thereof has a diameter between 26 inches and 27 inches and said safety panel has a length of 12.57 inches and a width of 3.5 inches.

19. The safety panel of claim 15, wherein the first wheel, the second wheel or combinations thereof has a diameter of 24 inches and said safety panel has a length of 11 inches and a width of 3 inches.

20. The safety panel of claim 15, wherein the first wheel, the second wheel or combinations thereof has a diameter between 16 inches and 20 inches and said safety panel has a length of 8 inches and a width of 2.5 inches.

21. The safety panel of claim 15, wherein the rigid display area is circular.

22. The safety panel of claim 15, wherein the rigid display area is crescent shaped and has an arc between 30 degrees and 90 degrees.

23. The safety panel of claim 15, wherein the rigid display area has an arc of 60 degrees.

24. The safety panel of claim 15, wherein said rigid display area is sheet plastic with a holding power of at least 1 lb per square inch and a shear of up to 60 pounds per square inch.

25. The safety panel of claim 24, wherein the safety panel is a material selected from the group consisting of polypropylene, Mylar, and acrylic.

26. A bicycle and safety panel combination, wherein said bicycle has a first wheel, and a second wheel, and wherein said first wheel has a first spoke and a second spoke, and said safety device comprises:

a. a rigid display area comprising
   i. a first side;
   ii. a second side;
   iii. a first attachment end for attachment around the first spoke;
   iv. a second attachment end for attachment around the first spoke;
   v. wherein said rigid display area has a thickness of $1/32^{nd}$ inch; and
   vi. wherein a pigment is embedded on the rigid display area;

b. a fold formed in said rigid display area, wherein said rigid display area wraps around the second spoke, and is oriented in a direction of wheel rotation;

c. a first adhesive strip and a second adhesive strip disposed on the first side and on the first attachment end;

d. a third adhesive strip and a fourth adhesive strip disposed on the first side proximate to each other and to the fold; and e. wherein the first attachment end of the rigid display area folds around the second spoke and secures to the first and second adhesive strips on one side of said first spoke and secures to said third and fourth adhesive strips on another side of the first spoke such that said second spoke nestles within said fold.

27. A safety panel for a bicycle having a first wheel and a second wheel and said first wheel has a first spoke and a second spoke, comprising a. a rigid display support comprising
   i. a first support end;
   ii. a second support end;
   iii. a first support side adapted for folding over the first spoke;
   iv. a second support side adapted for folding over the second spoke; and
   v. wherein said rigid display support has a thickness of $1/32$th inch;

b. a first adhesive strip and a second adhesive strip disposed on the first support side and on the first support end;

c. a third adhesive strip and a fourth adhesive strip disposed on the first support side and on the second support end; and d. a rigid display top having pigment embedded in the top, for attaching to said rigid display support, forming a laminate, and wherein said first spoke is disposed between said first and second adhesive strips and between said rigid display top and said rigid display support, and said second spoke is disposed between said third and fourth adhesive strips between said rigid display top and said rigid display support.

* * * * *